(12) United States Patent
Mukai et al.

(10) Patent No.: US 8,365,860 B2
(45) Date of Patent: Feb. 5, 2013

(54) STEERING CONTROL APPARATUS

(75) Inventors: Yasuhiko Mukai, Anjo (JP); Hideki Kabune, Nagoya (JP); Koichi Nakamura, Toyota (JP); Masashi Hori, Anjo (JP)

(73) Assignee: Denso Corporation, Kariya (JP)

( * ) Notice: Subject to any disclaimer, the term of this patent is extended or adjusted under 35 U.S.C. 154(b) by 107 days.

(21) Appl. No.: 13/134,464

(22) Filed: Jun. 8, 2011

(65) Prior Publication Data

US 2011/0303479 A1  Dec. 15, 2011

(30) Foreign Application Priority Data

Jun. 9, 2010  (JP) .................................. 2010-131747

(51) Int. Cl.
*B62D 5/04* (2006.01)
(52) U.S. Cl. ...................................... 180/446; 180/444
(58) Field of Classification Search .................. 180/443, 180/444, 446
See application file for complete search history.

(56) References Cited

U.S. PATENT DOCUMENTS

| | | | |
|---|---|---|---|
| 7,063,180 B2 | 6/2006 | Kojima et al. | |
| 8,200,393 B2* | 6/2012 | Kato et al. | ...................... 701/41 |
| 8,267,220 B2* | 9/2012 | Sugiyama et al. | ............ 180/446 |
| 2003/0192735 A1* | 10/2003 | Yamamoto | ..................... 180/444 |
| 2005/0167181 A1* | 8/2005 | Kato et al. | ..................... 180/443 |
| 2008/0027609 A1 | 1/2008 | Aoki et al. | |
| 2008/0264714 A1 | 10/2008 | Morikawa | |
| 2009/0000857 A1* | 1/2009 | Sugiyama et al. | ............ 180/444 |
| 2011/0011666 A1 | 1/2011 | Hori et al. | |
| 2012/0055730 A1* | 3/2012 | Mukai et al. | .................. 180/444 |

FOREIGN PATENT DOCUMENTS

| | | |
|---|---|---|
| JP | 2000-159134 | 6/2000 |
| JP | 2005-162124 | 6/2005 |
| JP | 2005-221053 | 8/2005 |
| JP | 2006-315625 | 11/2006 |
| JP | 2007-145273 | 6/2007 |
| JP | 2007-283926 | 11/2007 |
| JP | 2008-174047 | 7/2008 |
| JP | 2008-273327 | 11/2008 |
| JP | 2009-126421 | 6/2009 |
| JP | 2011-020489 | 2/2011 |

\* cited by examiner

*Primary Examiner* — Tony Winner
(74) *Attorney, Agent, or Firm* — Harness, Dickey & Pierce, PLC

(57) ABSTRACT

A steering control apparatus acquires vibration torque, which is generated by vibration of a gear mechanism when a steering wheel is operated at a steering angle. By setting the acquired vibration torque as a torque difference, an EPS motor current command value is corrected based on the torque difference thereby to calculate a corrected EPS motor current command value. Rattling and vibration caused in the gear mechanism are suppressed from being transferred to the steering wheel through an input shaft so that a driver is released from uncomfortable feeling.

11 Claims, 12 Drawing Sheets

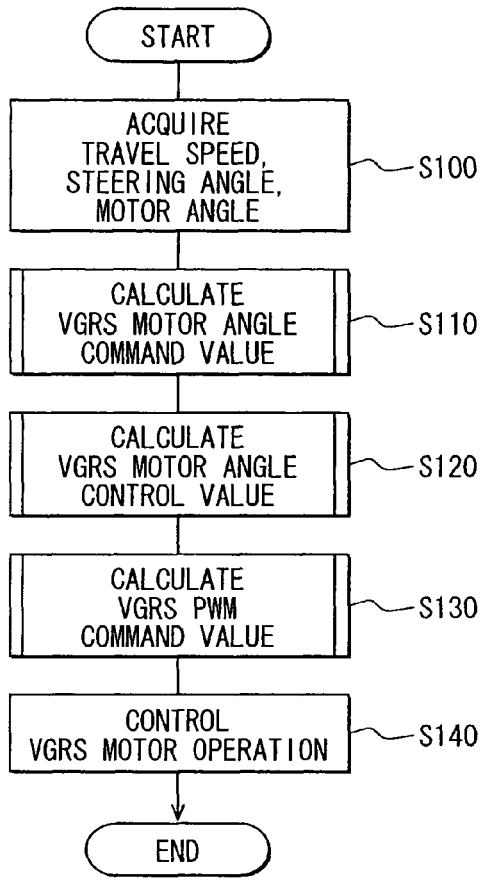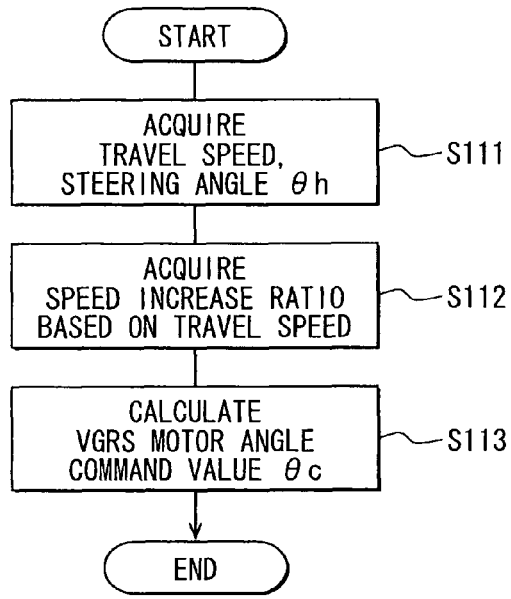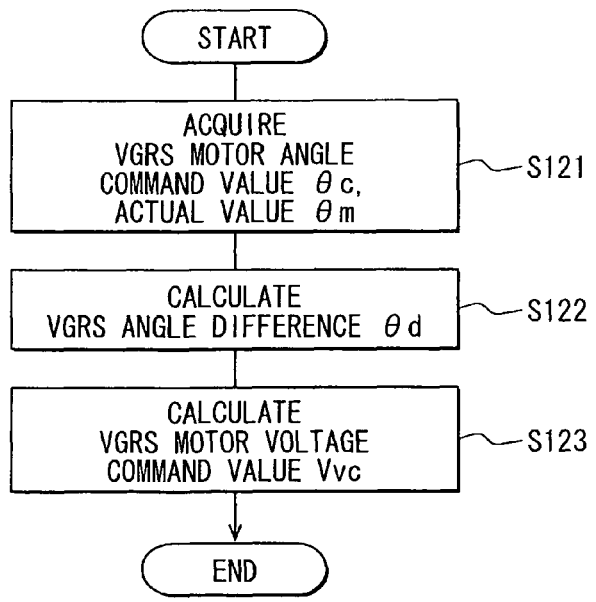

ns a flowchart showing control calculation process-

STEERING CONTROL APPARATUS

CROSS REFERENCE TO RELATED APPLICATION

This application is based on and incorporates herein by reference Japanese patent application No. 2010-131747 filed on Jun. 9, 2010.

FIELD OF THE INVENTION

The present invention relates to a steering control apparatus, which controls steering of tire wheels of a vehicle.

BACKGROUND OF THE INVENTION

It is conventionally known that a variable gear ratio steering (VGRS) device is capable of varying a ratio of a steered angle relative to a steering angle of a steering device. According to the following patent document 1, for example, a differential wheel mechanism and a variable gear ratio device are directly coupled to a shaft of a steering wheel provided as a steering device. The variable gear device has a gear ratio control motor, which drives the differential gear mechanism. It is recently also known that an electric power steering (EPS) device is used together with the VGRS apparatus as a mechanism for assisting steering operation of a vehicle. The electric power steering apparatus is operated electrically to generate torque.
(Patent document 1) JP 2008-273327A In the gear mechanism of the VGRS apparatus, vibration sometimes occurs due to manufacturing error of gears. In case the VGRS apparatus is provided to the shaft of the steering wheel, vibration caused by meshing of gears is directly transferred to the steering wheel. As a result, a driver is likely to feel uncomfortable.

SUMMARY OF THE INVENTION

It is an object of the present invention to provide a steering control apparatus, which is capable of suppressing uncomfortable feeling of a driver caused by vibration of meshing of gears in a gear mechanism in s power steering system.

According to one aspect of the present invention, a steering control apparatus comprises an input shaft coupled to a steering member operated by a driver, an output shaft provided rotatably relative to the input shaft and forming a torque transfer path for transferring steering torque applied to the steering member to vehicle wheels, a variable gear ratio device, a power steering device and a control circuit. The variable gear ratio device includes a gear mechanism and a first motor and is configured to variably control a ratio between a rotation angle of the input shaft and a rotation angle of the output shaft. The gear mechanism is configured to transfer rotation of the input shaft to the output shaft, and the first motor is configured to drive the gear mechanism. The power steering device includes a second motor and is configured to assist steering operation of the driver on the steering member by torque generated by driving the second motor. The control circuit includes a vibration torque acquisition part, a correction part and an operation part. The vibration torque acquisition part is configured to acquire vibration torque, which is generated by vibration of the gear mechanism when the steering member is operated. The correction part is configured to correct assist torque provided to assist the steering operation of the driver on the steering member based on the vibration torque acquired by the vibration torque acquisition part. The operation control part is configured to control the second motor to output a corrected assist torque determine by the correction part.

BRIEF DESCRIPTION OF THE DRAWINGS

The above and other objects, features and advantages of the present invention will become more apparent from the following detailed description made with reference to the accompanying drawings. In the drawings:

FIG. 6 is a flowchart showing control calculation processing of a VGRS device in the first embodiment of the present invention;

FIG. 7 is a flowchart showing VGRS motor rotation angle command value calculation processing in the first embodiment of the present invention;

FIG. 8 is a flowchart showing VGRS motor rotation angle control calculation processing in the first embodiment of the present invention;

DETAILED DESCRIPTION OF THE EMBODIMENT

First Embodiment

A steering control apparatus according to a first embodiment of the present invention will be described with reference to FIG. 1 to FIG. 19. General structure of a steering system 100 will be described first with reference to FIG. 1.

Figure 1:
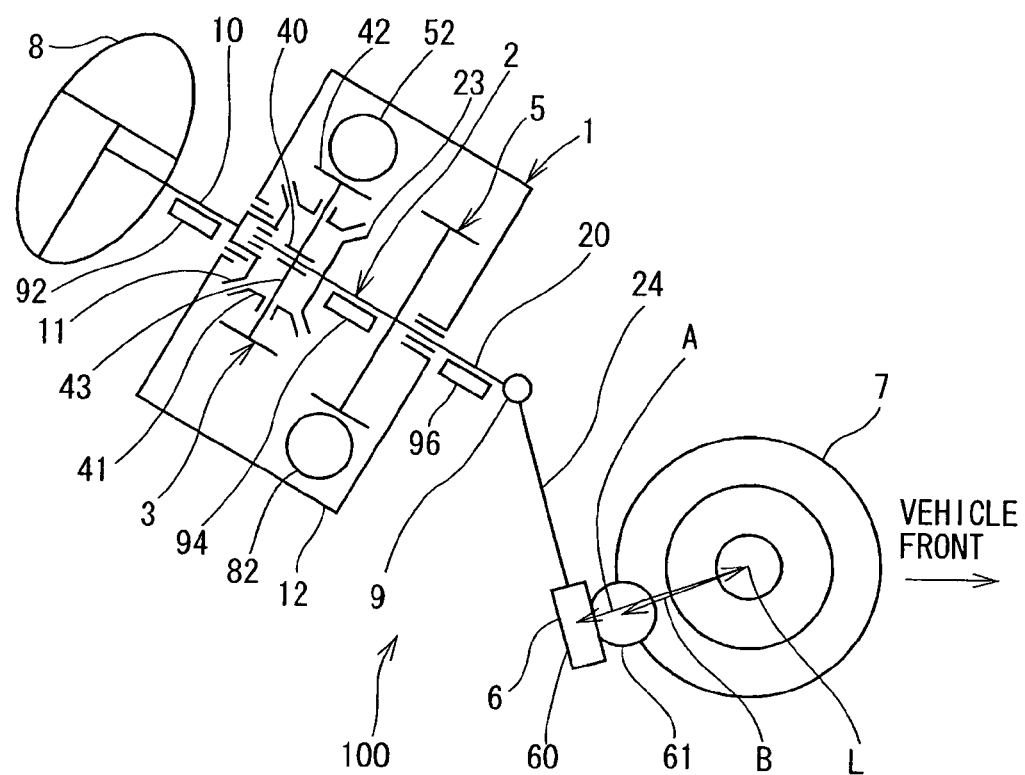
FIG. 1 is a schematic view showing a steering control system according to a first embodiment of the present invention.
Figure 2:
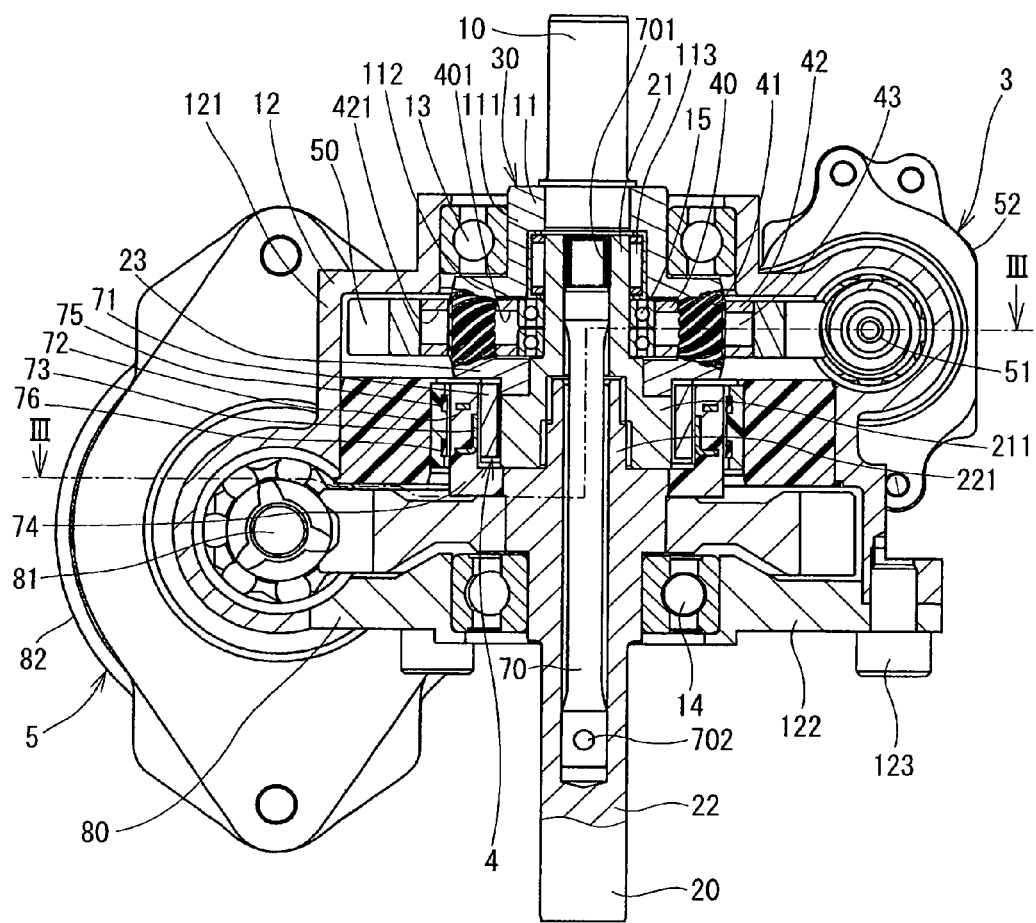
FIG. 2 is a sectional view of the steering control apparatus according to the first embodiment of the present invention.

As shown in FIG. 1, the steering system 100 includes a steering control apparatus 1, a column shaft 2, a rack-and-pinion mechanism 6, vehicle wheels (steered front wheels) 7, a steering wheel 8 as a steering device, and the like. The column shaft 7 and the rack-and-pinion mechanism 6 form a torque transfer path.

The steering control apparatus 1 includes a variable gear ratio steering device 3, an electric power steering device 5 and the like. The variable gear ratio steering device 3 varies a ratio between a rotation angle of an input shaft 10 and a rotation angle of an output shaft 20. The electric power steering device 5 is a power steering device, which generates assist torque for assisting steering operation of the steering wheel 8 by a driver. The variable gear ratio steering device 3 and the electric power steering device 5 are referred to as a VGRS device and an EPS device, respectively. The VGRS device 3 and the EPS device 5 are provided about the column shaft 2 and accommodated within a housing 12. The VGRS device 3 and the EPS device 5 are thus integrated into a single module.

In the power steering control apparatus 1, the column shaft 2 includes the input shaft 10, the output shaft 20. The output shaft 20 is coupled to a universal joint 9 and a shaft 24. The input shaft 10 is coupled to the steering wheel 8, which is steered by a driver. A steering wheel sensor 92 is provided on the input shaft 10 to detect a steering angle θh, which indicates an angle of steering of the steering wheel 8.

The output shaft 20 is provided coaxially with the input shaft 10 and relatively rotatable to the input shaft 10. The input shaft 10 and the output shaft 20 are rotated in opposite directions due to operation of a differential gear of the VGRS device 3. The output shaft 20 transfers steering torque, which is generated by steering operation of the steering wheel 8 by the driver, to the vehicle wheels 7 through the universal joint 9, the shaft 24 and the rack-and-pinion mechanism 6. A pinion angle sensor 96 is provided on the output shaft 20 to detect a pinion angle.

The rack-and-pinion mechanism 6 includes a steering pinion 60, a steering rack bar 61 and the like. The rack-and-pinion mechanism 6 is positioned at a rear side of a vehicle relative to a straight line (indicated by L in FIG. 1), which connects centers of rotation of the vehicle wheels 7, which are provided at a left side and a right side of the vehicle. The steering pinion 60 is a disk-shaped gear and provided at an axial end, which is opposite to the steering wheel 8. The steering pinion 60 is rotatable in both forward and reverse directions with the shaft 24. A steering rack bar 61 is provided movably in both left and right directions of the vehicle. As rack teeth provided on the steering rack bar 61 are meshed with the steering pinion 60, rotary motion of the steering pinion 60 is changed into linear motion of the steering rack bar 61 in left and right directions of the vehicle. That is, the rack-and-pinion mechanism 6 changes the rotary motion of the column shaft 2 to the linear motion.

Although not shown, tie rods and knuckle arms are provided at both ends of the steering rack bar 61 so that the steering rack bar 61 is coupled to the vehicle wheels 7 through the tie rods and the knuckle arms. Thus the vehicle wheels 7 at left and right sides are steered in correspondence to an amount of movement of the steering rack bar 61.

A distance between the steering pinion 60 and the straight line L connecting the centers of rotation of the vehicle wheels 7 is longer than a distance B between the steering rack bar 61 and the line L connecting the centers of rotation of the vehicle wheels 7. The output shaft 20 rotates in a direction opposite to that of the input shaft 10 because of operation of the differential gear provided between the input shaft 10 and the output shaft 20. For this reason, when the steering wheel 8 is steered in the counter-clockwise direction (left direction), the steering pinion 60 rotates in the clockwise direction when viewed from the side of the universal joint 9. The steering rack bar 61 moves in the right direction and the steered angle of the vehicle wheels 7 is varied so that the vehicle turns in the left direction. When the steering wheel 8 is steered in the clockwise direction (right direction), the steering pinion 60 rotates in the counter-clockwise direction when viewed from the side of the universal joint 9. The steering rack bar 61 moves in the left direction and the steered angle of the vehicle wheels 7 is varied so that the vehicle turns in the right direction.

By thus setting the distance A between the steering pinion 60 and the straight line L connecting the centers of rotation of the vehicle wheels 7 to be longer than the distance B between the steering rack bar 61 and the straight line L connecting the centers of rotation of the vehicle wheels 7, that is, A>B, the vehicle wheels 7 are steered in the direction opposite to the direction of rotation of the output shaft 20, the shaft 24 and the steering pinion 60. The direction of rotation of the steering wheel 8 and the direction of steered angle of the vehicle wheels 7 are matched.

As described above and shown in FIG. 2 and FIG. 3, the steering control apparatus 1 includes the housing 12, the input shaft 10, the output shaft 20, the VGRS device 3, the EPS device 5. The housing 12 is formed of a housing body 121 and an end frame 122. The housing body 121 and the end frame 122 are fixed to each other by screws 123. A gear mechanism 30 is accommodated within the housing 12. The input shaft 10 and the output shaft 20 are passed through the housing 12. A first bearing device 13 is provided in the housing body 121 at a side, which is opposite to the end frame 122. A second bearing device 14 is provided in the end frame 122.

The output shaft 20 is formed of a first output shaft 21 and a second output shaft 22. The first output shaft 21 and the second output shaft 22 are formed in a hollow pipe shape. A torsion bar 70 is passed through the inside of the hollow pipe. The first output shaft 21 is provided closer to the input shaft 10 than the second output shaft 22 is. The first output shaft 21 has an enlarged part 211 having a large inner diameter at a side opposite to the input shaft 10. The second output shaft 22 has a reduced part 221 at a side of the first output shaft 21. The reduced part 221 is smaller in outer diameter than an inner diameter of the enlarged part 211. The reduced part 221 of the second output shaft 22 is inserted into the enlarged part 211 of the first output shaft 21.

The torsion bar 70 is passed through a space formed in a radially inside part of the first output shaft 21 and the second output shaft 22. Serration 701 is formed on the torsion bar 70 at an axial end of the torsion bar 70 at a side of the input shaft 10. The serration 701 is tightly fit with serration formed on a radially inside face of the first output shaft 21. The end of the torsion bar 70, which is opposite to the input shaft 10, is coupled to the output shaft 22 by a pin 702. Thus, the first output shaft 21 and the second output shaft 22 are thus coupled to be relatively rotatable by the torsion bar 70. When torsion torque is applied to the torsion bar 70 because of relative rotation between the first output shaft 21 and the second output shaft 22, twist of predetermined resiliency generated about the shaft is generated. As a result, the torque applied between the first output shaft 21 and the second output shaft 22. Twist displacement of the torsion bar 70 is detected by a steering torque detection device 4.

The steering torque detection device 4 detects steering torque by detecting twist displacement. The steering torque detection device 4 includes multiple-pole magnets 71, a set of steering torque magnetic yoke 72, 73, a set of magnetic flux collecting rings 75, 76 and a torque sensor 94 shown in FIG. 6, etc. The steering torque detection device 4 is provided with a slight gap in the axial direction relative to an output gear 23, which will be described later.

Multiple-pole magnets 71 are formed in an annular ring shape and press-fitted with the first output shaft 21. Thus, the multiple-pole magnets 71 rotate with the first output shaft 21. The multiple-pole magnets 71 are positioned at a side more opposite to the input shaft 10 in the axial direction than an output gear 23 press-fitted with the first output shaft 21. The multiple-pole magnets 71 are magnetized with N-pole and S-pole alternately in the circumferential direction.

The set of magnetic yokes 72 and 73 are provided radially outside of the multiple-pole magnets 71 and in magnetic field formed by the multiple-pole magnets 71. The magnetic yokes 72 and 73 have nails, which extend in the axial direction from a set of annular ring parts facing in the axial direction, respectively. The nails of the yokes 72 and 73 are interleaved alternately by shifting in the circumferential direction. The magnetic yokes 72 and 73 are molded integrally with a resin mold 74. The resin mold 74 is press-fitted on the radially outside part of the second output shaft 22 through a collar, which is not shown. Thus, the magnetic yokes 72 and 73 rotate with the second output shaft 22.

The set of magnetic flux collecting rings 75 and 76 are formed in an annular shape and provided radially outside the resin mold 74, which molds the magnetic yokes 72 and 73, in a manner to be relatively rotatable against the resin mold 74. One magnetic flux collecting ring 75 is positioned to correspond to one yoke 72 in the axial direction. The other magnetic flux collecting ring 76 is positioned to correspond to the other magnetic yoke 73 in the axial direction. Although not shown, an air gap is provided between the magnetic flux collecting ring 75 and the magnetic flux collecting ring 76. The torque sensor 94 is positioned in the air gap to detect magnetic flux density in the air gap.

A method of detecting steering torque by the torque sensor 94 will be described next. When no steering torque is applied to the output shaft 20, no twist displacement is generated in the torsion bar 70. In this instance, a center of each nail of the magnetic yokes 72 and 73 and a boundary line between the N-pole and the S-pole of the magnet 71 are in alignment. The same number of magnetic lines come in the nails of the magnetic yokes 72 and 73 from the N-pole of the magnet 71 and go out from the magnetic yokes 72 and 73 to the S-pole of the magnet 71. The magnetic lines inside the magnetic yoke 72 are closed, and the magnetic lines inside the magnetic yoke 73 are closed. No magnetic flux thus leaks in the air gap formed between the magnetic flux collecting rings 75 and 76. As a result, the magnetic density detected by the torque sensor 94 is zero.

When steering torque is applied to the output shaft 20 on the other hand, twist displacement is generated in the torsion bar 70. In this instance, the relative position between the multiple-pole magnets 71 and the magnetic yoke 72 and 73 is changed in the circumferential direction. The center of each nail of the magnetic yokes 72 and 73 and the boundary line between the N-pole and the S-pole of the magnet 71 are not in alignment any more. Magnetic lines having polarities of the N-pole and the S-pole increase in the magnetic yokes 72 and 73, respectively. Magnetic flux thus leaks in the air gap formed between the magnetic flux collecting rings 75 and 76. As a result, the magnetic density detected by the torque sensor 94 is not zero any more. The magnetic density detected by the torque sensor 94 is generally proportional to the twist displacement amount of the torsion bar 70, and polarity of the detected magnetic density reverses in correspondence to the direction of twisting. Thus, the twist displacement of the torsion bar 70 is detected. As described above, the torque generated between the first output shaft 21 and the second output shaft 22 is converted into twist displacement of the torsion bar 70. The steering torque detection device 4 thus detects torque generated between the first output shaft 21 and the second output shaft 22 by detecting magnetic density generated in the air gap.

The VGRS device 3 includes the gear mechanism 30 and a VGRS motor 52, which is provided as a first motor for driving the gear mechanism 30. The gear mechanism 30 is formed of an input gear 11, an output gear 23, a pinion gear 41, a worm wheel 50 and a worm 51. The input gear 11, the output gear 23 and the pinion gear 42 correspond to a differential gear. The worm wheel 50 and the worm 51 correspond to a worm gear.

The input gear 11 is positioned at a side opposite to the steering wheel 8 of the input shaft 10. The input gear 11 is a bevel wheel, which is made of metal or resin and meshes the pinion gear 41. The input gear 11 includes a cylindrical tube part 111 and a gear part 112, which is formed in a bevel shape and positioned radially outside the tubular part 111. The input shaft 10 is press-inserted into the tubular part 111. The tubular part 111 is supported rotatably relative to the housing body 121 by the first bearing part 13 provided in the housing body 121. The input shaft 10 and the input gear 11 are thus supported rotatably in the housing 12. An axial end part of the first output shaft 21, which is at the side of the input shaft 10, is inserted in the radially inside part of the input gear 11. A needle bearing 113 is provided between the input gear 11 and the first output shaft 21. The first output shaft 21 is thus supported rotatably by the input gear 11.

The output gear 23 is provided to face the gear part 112 of the input gear 11 sandwiching the pinion gear 41. The output gear 23 is a bevel gear, which is made of metal or resin and meshes the pinion gear 41. The first output shaft 21 of the output shaft 20 is press-fitted into the output gear 23. The output gear 23 is provided at a position, which is more opposite to the input shaft 10 in the axial direction than the needle bearing 113 is.

A plurality of pinion gears 41 is provided between the input gear 11 and the output gear 23. The pinion gear 41 is a bevel wheel, which mesh the input gear 11 and the output gear 23. Here, relation among the input gear 11, the output gear 23 and the pinion gear 41 will be described. The number of teeth of the pinion gear 41 is even. The numbers of teeth of the input gear 11 and the output gear 23 are the same and odd. As a result, the point of contact between the teeth of the input gear 11 and the pinion gear 41 varies in correspondence to rotation. Similarly, the point of contact between the teeth of the output gear 23 and the pinion gear 41 varies in correspondence to rotation. For this reason, it is less likely that wear of a specified tooth progresses and local wear shortens durability. The input gear 11, the output gear 23 and the pinion gear 41 have spiral teeth so that rate of meshing between the input gear 11 and the pinion gear 41 and the rate of meshing between the output gear 23 and the pinion gear 41 are increased. In case that the input gear 11 and the output gear 23 are made of metal, the pinion gear 41 is made of resin. In case that the input gear 11 and the output gear 23 are made of resin, the pinion gear 41 is made of metal.

The pinion gear 41 is positioned radially outside of the first output shaft 21 so that its rotation axis perpendicularly crosses the rotation axis of the input shaft 10 and the output shaft 20. The pinion gear 41 is formed an axial hole, through which a pinion gear shaft member 43 is passed. The axial hole formed in the pinion gear 41 is formed to have a diameter, which is slightly larger than an outer diameter of the pinion gear shaft member 43.

A third bearing and an inner ring member 40 are provided between the pinion gear 41 and the first output shaft 21. The third bearing 15 is positioned between the needle bearing 113 and the output gear 23 in the axial direction and between the first output shaft 21 and the inner ring member 40 in the radial direction. The third bearing 15 thus rotatably supports the inner ring member 40 at a position radially outside the first output shaft 21.

The inner ring member 40 is formed first holes 401, which pass in a direction perpendicular to the rotation axis of the first output shaft 21. The first holes 401 are formed equi-angularly in the circumferential direction of the inner ring member 40. One axial end of the pinion gear shaft member 43, which is passed through the pinion gear 41, is press-fitted in the first hole 401.

An outer ring member 42 is provided radially outside the inner ring member 40 sandwiching the pinion gear 41. The outer ring member 42 is formed second holes 402, which pass in a direction perpendicular to the rotation axis of the first output shaft 21. The second holes 421 are formed equi-angularly in the circumferential direction of the outer ring member 42. The second holes 421 are formed at positions, which correspond to the first holes 401 of the inner ring member 40. The other axial end of the pinion gear shaft member 43, which is passed through the pinion gear 41, is press-fitted in the second hole 421. The other axial end of the pinion gear shaft member 43 is opposite to the axial end of the same fitted in the first hole 401. That is, the pinion gear 41 is positioned between the inner ring member 40 and the outer ring member 42 to be rotatable about an axis of the pinion gear shaft member 43, which is supported by the inner ring member 40 and the outer ring member 42.

The worm wheel 50 is press-fitted on the radially outside part of the outer ring member 42. That is, the first output shaft 21, the third bearing 15, the inner ring member 40, the pinion gear 41, the outer ring member 42 and the worm wheel 50 are arranged in this order from the radially inside part. The inner ring member 40, the outer ring member 42, the pinion gear shaft member 43 and the worm wheel 50 rotate together as a single body. The third bearing 15 rotatably supports the inner ring member 40, the outer ring member 42, the pinion gear shaft member 43 and the worm wheel 50 at a position radially outside the first output shaft 21.

Figure 3:
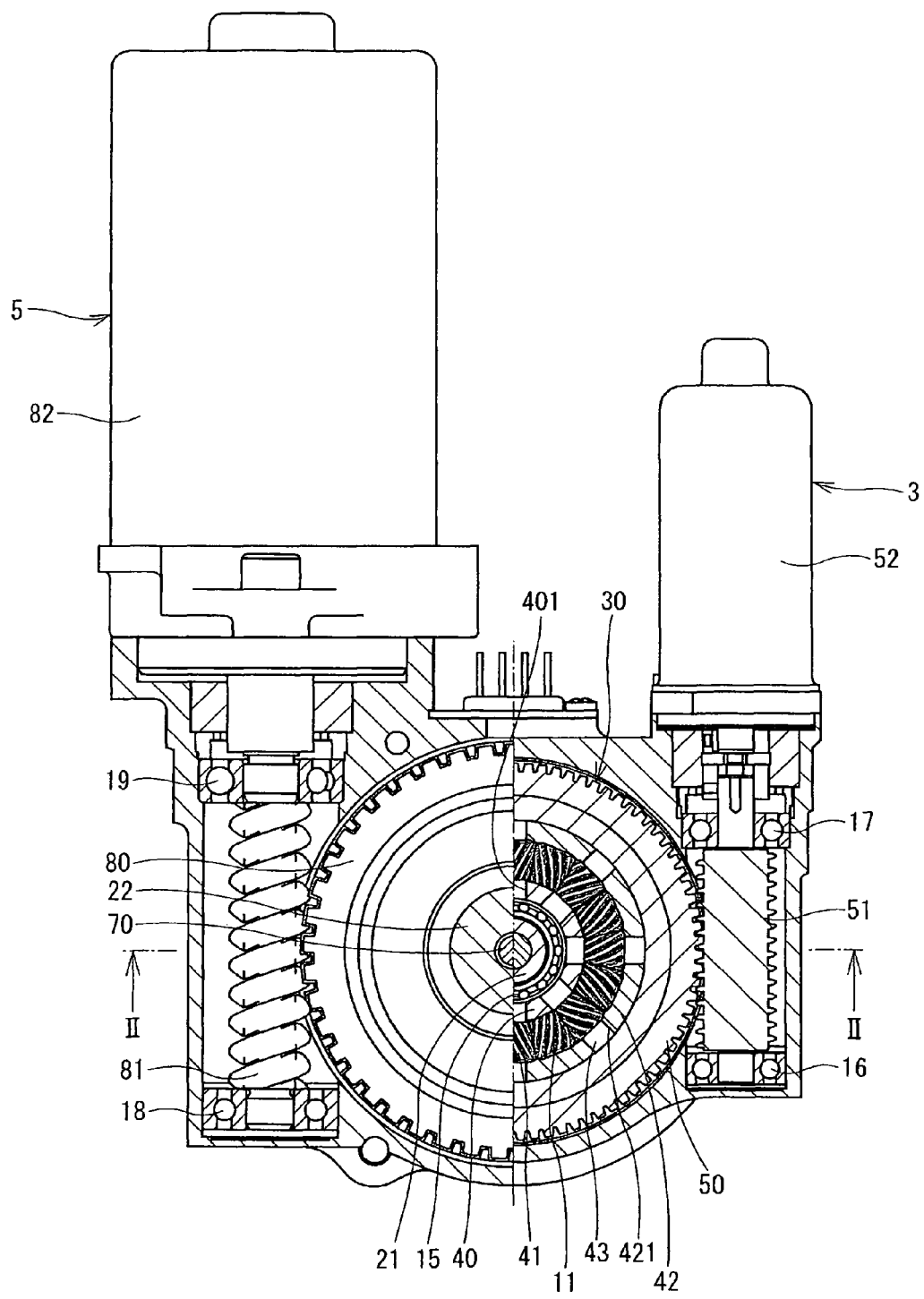
FIG. 3 is a sectional view of the steering control apparatus taken along line in FIG. 2.

As shown in FIG. 3, the worm 51 meshes the radially outside part of the worm wheel 50. The worm 51 is supported rotatably by a fourth bearing 16 and a fifth bearing 17 provided in the housing 12. Lead angles of the worm wheel 50 and the worm 51 are so set that an advance angle is smaller than a friction angle. Thus, the worm wheel 50 and the worm 51 are capable of self-locking. That is, the lead angles of the worm wheel 50 and the worm 51 are set to allow self-locking.

The VGRS motor 52 is provided at a side of the fifth bearing 17 of the worm 51. The VGRS motor 52 is a brush motor. The VGRS motor 52 drives the worm 51 in forward and reverse directions in correspondence to energization (current supply). When the VGRS motor 52 drives the worm 51 in the forward direction and the worm wheel 50 correspondingly rotates in the same direction as the rotation direction of the input shaft 10, the rotation of the input shaft 10 is transferred to the output shaft 20 after being reduced in speed. When the VGRS motor 52 drives the worm 51 in the reverse direction and the worm wheel 50 correspondingly rotates in a direction opposite to the rotation direction of the input shaft 10, the rotation of the input shaft 10 is transferred to the output shaft 20 after being increased in speed. Thus, the rotation angle of the input shaft 10 and the rotation angle of the output shaft 20 are varied.

The EPS device 5 is provided at a position opposite to the VGRS motor 52 sandwiching the input shaft 10 and the output shaft 20. The EPS device 5 includes an EPS worm wheel 80, an EPS worm 81 and an EPS motor 82, which is provided as a second motor. The wheel 80 and the EPS worm 81 are accommodated within the housing 12.

The worm wheel 80 is made of resin or metal. The wheel 80 is press-fitted on the second output shaft 22 and rotates together with the second output shaft 22. The EPS worm 81 meshes the radially outside part of the wheel 80. The EPS worm 81 is supported rotatably by a sixth bearing 18 and a seventh bearing 19, which are provided in the housing 12. Teeth of the wheel 80 are so formed that each tooth line is parallel with the rotation shaft. A tooth bottom of the wheel 80 formed to be planer and not arcuate. Thus, even if the position of placing the wheel 80 deviates in the axial direction of the second output shaft 22 due to manufacturing error, contact between the wheel 80 and the EPS worm 81 can be maintained similarly in both cases of forward rotation and reverse rotation.

An EPS motor 82 is provided at a side of a seventh bearing 19 of the EPS worm 81. The EPS motor 82 is a brushless three-phase motor. The EPS motor 82 drives the EPS worm 81 to rotate in forward and reverse directions depending on energization. When the wheel 80 meshed with the EPS worm 81 applies steering assist torque to the second output shaft 22, steering operation is assisted.

Figure 4:
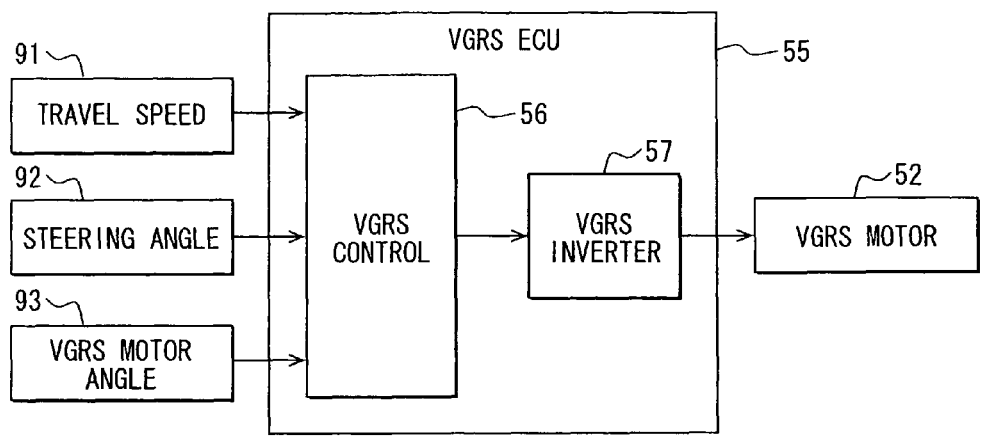
FIG. 4 is a block diagram showing a VGRS-ECU according to the first embodiment of the present invention.

A VGRS electronic control unit (VGRS-ECU) for controlling drive of the VGRS motor 52 and an EPS electronic control unit (EPS-ECU) for controlling drive of the EPS motor 82 will be described with reference to FIG. 4 and FIG. 5. FIG. 4 is a block diagram showing the VGRS-ECU 55, and FIG. 5 is a block diagram showing the EPS-ECU 85.

As shown in FIG. 4, the VGRS-ECU 55 includes a VGRS control part 56 and a VGRS inverter 57. The VGRS control part 56 is formed as an electronic computer circuit, which includes a CPU, a ROM, a RAM, an I/O and a bus line connecting these components, and performs drive control for the VGRS motor. The control part 56 is connected to a vehicle travel speed sensor 91 for detecting a vehicle travel speed of a vehicle, a steering angle sensor 92 for detecting a rotation angle of the steering wheel 8, a VGRA motor rotation angle sensor 93 for detecting a rotation angle of the VGRS motor 52, and the like.

The VGRS inverter 57 is formed of a plurality of switching elements and switches over energization of the VGRS motor 52. The switching elements forming the VGRS inverter 57 are turned on and off by the VGRS control part 56 based on the vehicle travel speed, the steering angle, the VGRS motor rotation angle. That is, the VGRS control part 56 controls operation of the VGRS motor 52 by controlling the VGRS inverter 57 based on the vehicle travel speed, the steering wheel angle, the VGRS motor rotation angle.

Figure 5:
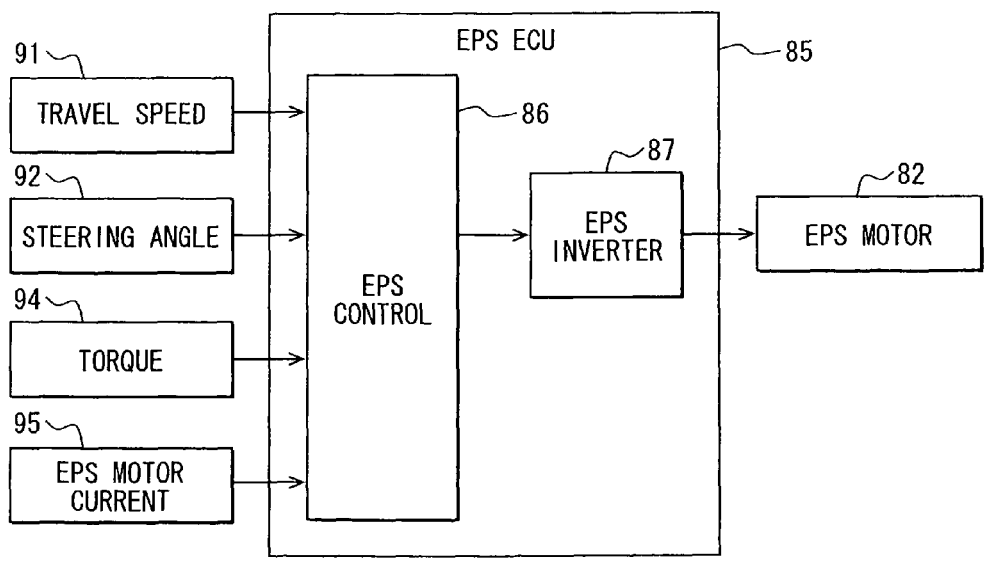
FIG. 5 is a block diagram showing an VGRS-ECU according to the first embodiment of the present invention.

As shown in FIG. 5, the EPS-ECU 85 includes an EPS control part 86 and an EPS inverter 87. The EPS control part 86 is formed as an electronic computer circuit, which includes a CPU, a ROM, a RAM, an I/O and a bus line connecting these components, and performs drive control for the EPS motor 82. The VGRS control part 56 is connected to the vehicle travel speed sensor 91, the steering angle sensor 92, a torque sensor 94 for detecting steering torque of the steering wheel 8, an EPS motor current sensor 95 for detecting motor current supplied to the EPS motor 82.

The EPS inverter 87 is formed of a plurality of switching elements and switches over energization of the EPS motor 82. The switching elements forming the EPS inverter 87 are turned on and off by the EPS control part 86 based on the vehicle travel speed, the steering torque, the motor current and the like. That is, the EPS control part 86 controls operation of the EPS motor 82 by controlling the EPS inverter 87 based on the vehicle travel speed, the steering torque, the motor current.

Control processing for the VGRS device 3 by the VGRS control part 56 will be described next with reference to FIG. 6 to FIG. 9. A main part of the control processing of the EPS device 56 for the VGRS device 3 is shown in FIG. 6.

First at S100 (S indicates a step), a vehicle travel speed sensor value outputted by the vehicle travel speed sensor 91 is retrieved and the vehicle travel speed of the vehicle is acquired. Further, a steering wheel angle sensor value outputted by the steering wheel angle sensor 92 is retrieved and the steering angle of the steering wheel 8 is acquired. In addition, a VGRS motor rotation angle sensor value outputted by the VGRS motor rotation angle sensor 93 is retrieved and the VGRS motor rotation angle is acquired. At S110, VGRS motor rotation angle command value calculation processing is performed. At S120, VGRS motor rotation angle control calculation processing is performed. At S130, a VGRS motor PWM command value calculation processing is performed. At S140, the operation of the VGRS motor 52 is controlled by switching over on/off of the switching elements forming the VGRS inverter 57 based on the PWM command value calculated at S130.

The VGRS motor rotation angle command value calculation processing will be described with reference to FIG. 7. At S111, the vehicle travel speed sensor value outputted by the vehicle travel speed sensor 91 is retrieved to acquire the vehicle travel speed of the vehicle. Further, the steering angle sensor value outputted by the steering wheel angle sensor 92 is retrieved to acquire the steering angle of the steering wheel 8.

Figure 10:
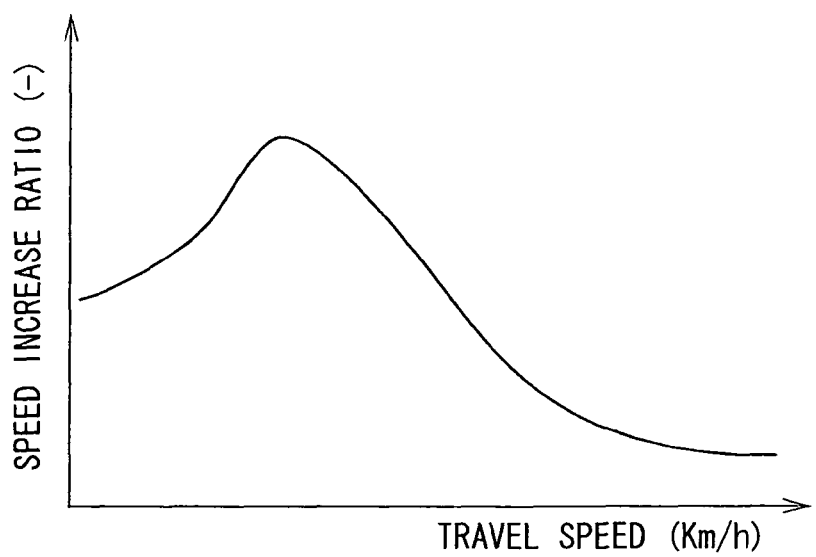
FIG. 10 is a graph showing a relation between a vehicle travel speed and a speed increase ratio in the first embodiment of the present invention.

At S112, a speed increase ratio is acquired based on the vehicle travel speed acquired at S111. The speed increase ratio is defined as a ratio between the rotation angle of the input shaft 10 and the rotation angle of the output shaft 20. It is calculated by dividing the rotation angle of the output shaft 20 by the rotation angle of the input shaft 10. If the speed increase ratio is 1, the rotation angle of the input shaft 10 and the rotation angle of the output shaft 20 are the same. The rotation direction of the input shaft 10 and the rotation direction of the output shaft 20 are opposite due to operation of the differential gear. For this reason, if the input shaft 10 rotates an angle θh in the clockwise direction when viewed from the steering wheel 8 under a speed increase ratio 1, the output shaft 20 rotates an angle θh in the counter-clockwise direction. It is assumed that the rotation angles are positive and negative when the steering wheel 8 is turned in the clockwise direction and the counter-clockwise direction, respectively. The relation between the vehicle travel speed and the speed increase ratio is pre-stored in a memory as a data map. The relation between the vehicle travel speed and the speed increase ratio is pre-stored as a data map shown in FIG. 10. As shown in FIG. 10, the speed increase ratio increases as the vehicle travel speed increases in a range, in which the vehicle travel speed is lower than a predetermined speed. The speed increase ratio decreases as the vehicle travel speed increases in a range, in which the vehicle travel speed is higher than the predetermined speed.

Referring back to FIG. 7, at S113, the VGRS motor rotation angle command value θc is calculated, thereby ending this processing. Assuming that the steering wheel angle, the speed increase ratio and the reduction ratio of the worm gear are θh, z and i, respectively, the VGRS motor rotation angle command value θc is calculated by the following equation (1).

$$\theta c = \theta h \times (z-1) \times i \times 0.5 \quad (1)$$

The VGRS motor rotation angle control calculation processing will be described next with reference to FIG. 8. At S121, the VGRS motor rotation angle command value θc calculated at S113 in FIG. 7 is retrieved. Further, a VGRS motor rotation angle sensor value outputted by the VGRS motor rotation angle sensor 93 is retrieved to acquire the VGRS motor rotation angle θm. At S122, an angle difference value θd is calculated. The angle difference value θd is calculated by the following equation (2).

$$\theta d = \theta c - \theta m \quad (2)$$

At S123, a VGRS motor voltage command value Vvc is calculated, thereby ending this processing. The VGRS motor voltage command value Vvc is feedback-controlled by using PI control. Assuming that a proportional gain and an integral gain in the VGRS motor feedback-control are KPv and KIv, respectively, the VGRS motor voltage command value Vvc is calculated by the following equation (3).

$$Vvc = KPv \times \theta d + KIv \times \int \theta d \, dt \quad (3)$$

Figure 9:
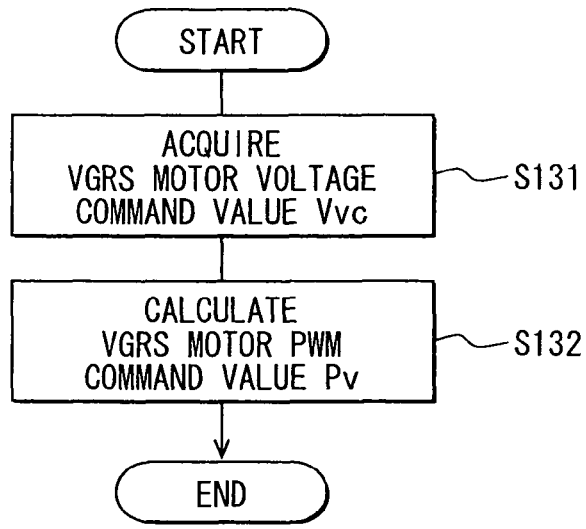
FIG. 9 is a flowchart showing PWM command value calculation processing executed by the VGRS device in the first embodiment of the present invention.

The VGRS motor PWM command value calculation processing will be described with reference to FIG. 9. At S131, the VGRS motor voltage command value Vvc calculated at S123 in FIG. 8 is acquired. At S132, a VGRS motor PWM command value Pv is calculated. Assuming that a battery voltage is Vb, the VGRS motor PWM command value is calculated by the following equation (4).

$$Pv = Vvc/Vb \times 100 \quad (4)$$

The VGRS control part 56 controls the operation of the VGRS motor 52 by controlling timing of on/off of the switching elements of the VGRS inverter 57 based on the VGRS motor PWM command value Pv calculated by the foregoing equation (4).

Figure 11:
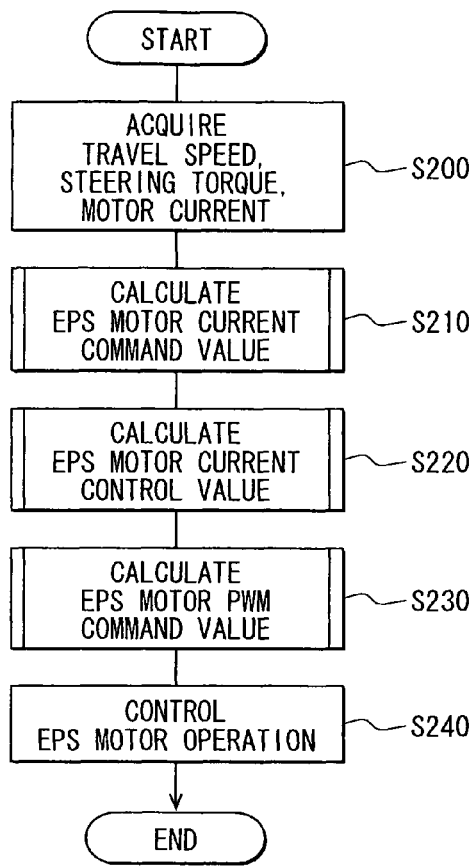
FIG. 11 is a flowchart showing control calculation processing of an EPS device in the first embodiment of the present invention.

Control processing for the EPS part 5 by the EPS control part 86 will be described next with reference to FIG. 11 to FIG. 14. A main part of the control processing of the part 86 for the EPS device 5 is shown in FIG. 11. First at S200, the vehicle travel speed sensor value outputted by the vehicle travel speed sensor 91 is retrieved and the vehicle travel speed of the vehicle is acquired. Further, a torque sensor value outputted by the torque sensor 94 is retrieved and the steering torque generated when the steering wheel 8 is operated by a driver is acquired. In addition, a current sensor value outputted by the EPS motor current sensor 95 is retrieved and the motor current supplied to the EPS motor 82 is acquired.

At S210, EPS motor current command value calculation processing is performed. At S220, EPS motor current control calculation processing is performed. At S230, a PWM command value calculation processing is performed. At S240, the operation of the EPS motor 82 is controlled by switching over on/off of the switching elements forming the EPS inverter 87 based on the PWM command value calculated at S230.

Figure 12:
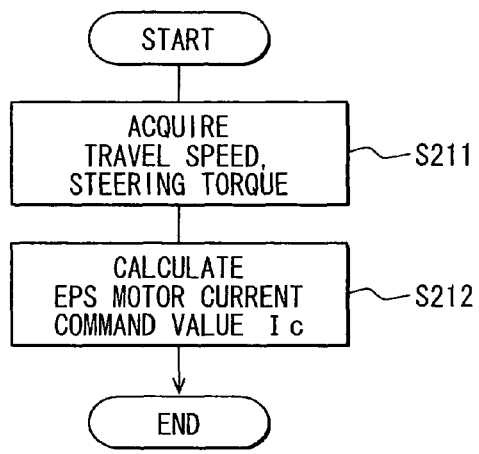
FIG. 12 is a flowchart showing EPS motor current command value calculation processing in the first embodiment of the present invention.

The EPS motor current command value calculation processing will be described with reference to FIG. 12. At S211, the vehicle travel speed sensor value outputted by the vehicle travel speed sensor 91 is retrieved to acquire the vehicle travel speed of the vehicle. Further, the torque sensor value outputted by the torque sensor 94 is retrieved to acquire the steering torque generated when the steering wheel 8 is operated by the driver.

Figure 15:
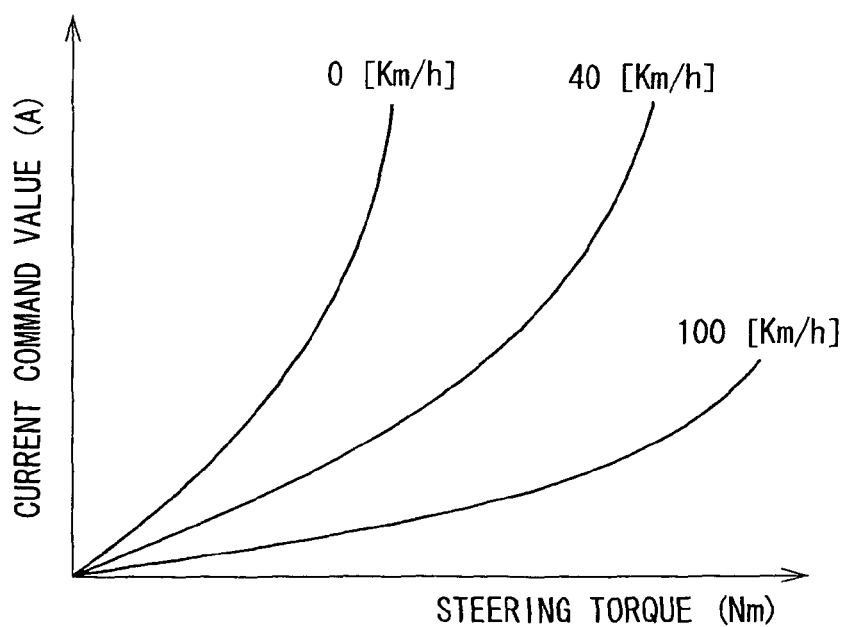
FIG. 15 is a graph showing a relation among a steering torque, a vehicle travel speed and an EPS current command value in the first embodiment of the present invention.

At S212, the EPS motor rotation current command value Ic is calculated based on the vehicle travel speed and the steering torque acquired at S211, thereby ending this processing. The relation between the steering torque and the EPS motor current command value Ic at each travel speed is pre-stored in a memory as a data map. The relation between the steering torque and the EPS motor current command value Ic is pre-stored for each travel speed as a data map shown in FIG. 15. As shown in FIG. 15, the EPS motor current command value Ic increases as the steering torque increases. The EPS motor current command value Ic is decreases as the vehicle travel speed increases under a condition that the steering torque is the same.

The EPS motor current command control calculation processing will be described next with reference to FIG. 13. At S221, the EPS motor current command value Ic calculated at S212 in FIG. 12 is retrieved. Further, the current sensor value outputted by the EPS motor current sensor 95 is retrieved to acquire the motor current Im supplied to the EPS motor 82. At S222, a current difference value Id is calculated. The current difference value Id is calculated by the following equation (5).

$$Id = Ic - Im \quad (5)$$

At S223, an EPS motor voltage command value Vec is calculated, thereby ending this processing. The EPS motor voltage command value Vec is feedback-controlled by using PI control. Assuming that a proportional gain and an integral gain in the EPS motor feedback-control are KPe and KIe, respectively, the VGRS motor voltage command value Vec is calculated by the following equation (6).

$$Vec = KPe \times Id + KIe \times \int Id\, dt \quad (6)$$

The EPS motor PWM command value calculation processing will be described with reference to FIG. 14. At S231, the EPS motor voltage command value Vec calculated at S223 in FIG. 13 is acquired. At S232, an EPS motor PWM command value Pe is calculated. Assuming that the battery voltage is Vb, the EPS motor PWM command value is calculated by the following equation (7).

$$Pe = Vec/Vb \times 100 \quad (7)$$

The EPS control part 86 controls the operation of the EPS motor 82 by controlling timing of on/off of the switching elements of the EPS inverter 87 based on the EPS motor PWM command value Pe calculated by the foregoing equation (7).

Figure 16A:
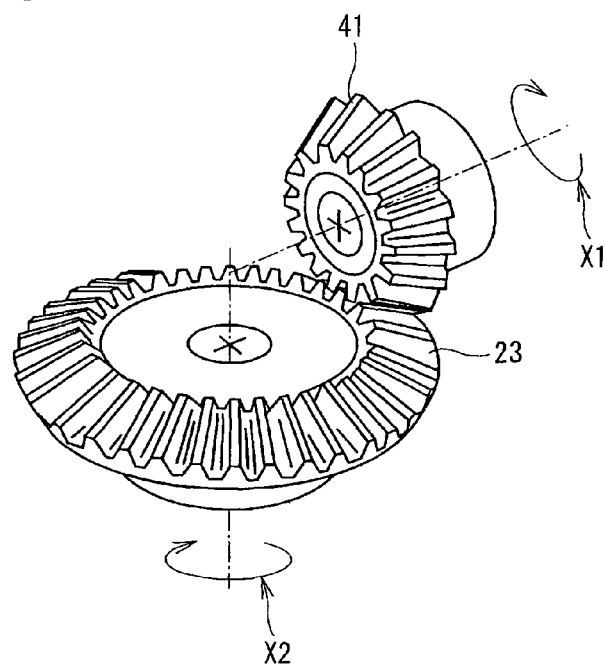
FIGS. 16A and 16B are an explanatory view and a time chart showing torque pulsation in case of a gear, which is not a spiral gear, respectively.
Figure 16B:
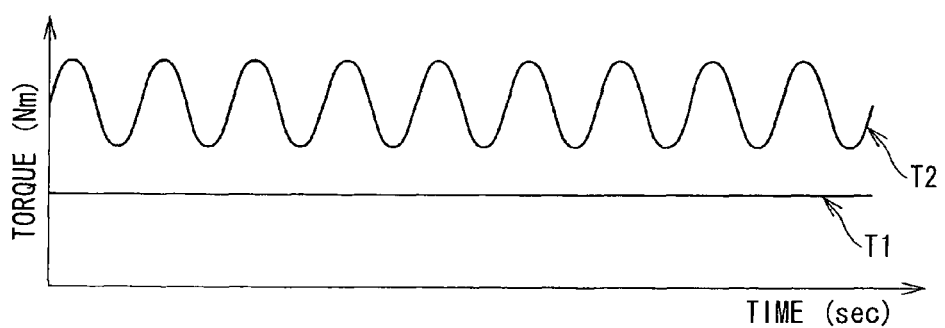
Figure 17A:
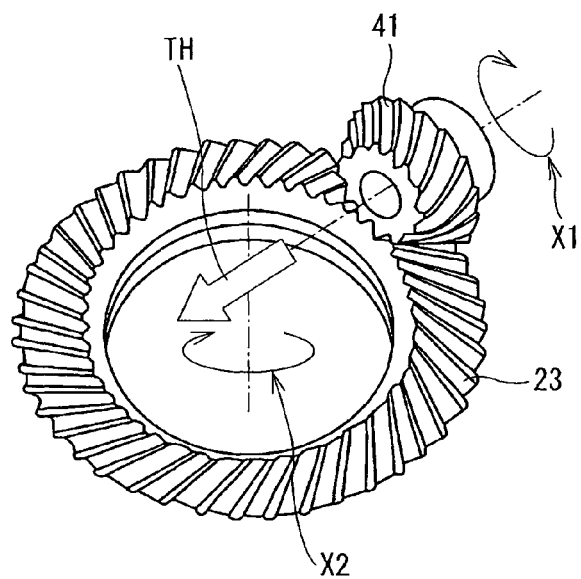
FIGS. 17A and 17B are an explanatory view and a time chart showing torque pulsation in case of a spiral gear, respectively.

If gears forming the gear mechanism 30 have dimensional errors due to manufacturing tolerance, the gears rattle and generate torque pulsation. The torque pulsation caused by rattling of the gears will be described with reference to FIG. 16 and FIG. 17. FIG. 16A and FIG. 17A schematically show the pinion gear 41 and the output gear 23. The teeth of the pinion gear 41 and the output gear 23 are spiral. FIG. 16A shows, however, that the teeth of the pinion gear 41 and the output gear 23 are not spiral.

The torque pulsation will be described with reference to FIG. 16, in which the teeth of the pinion gear 41 and the output gear 23 are not spiral. It is assumed here that the number of teeth of the pinion gear 41 is N1 and the number of teeth of the output gear 23 is N2. When the pinion gear 41 rotates as indicated by X1, the output gear 23 rotates as indicated by X2 so that the torque inputted to the pinion gear 41 is transferred to the output gear 23. Assuming that torque transfer efficiency from the pinion gear 41 to the output gear 23 is η, output torque T2 transferred to the output gear 23 when the pinion gear 41 is rotated by fixed input torque T1 is calculated as expressed by the following equation (8).

$$T2 = N2/N1 \times \eta \times T1 \quad (8)$$

The torque efficiency η is constant, if the pinion gear 41 and the output gear 23 are manufactured ideally without any dimensional errors. If the pinion gear 41 and the output gear 23 have dimensional errors, however, the torque transfer efficiency η varies depending on combinations of meshed gears. For this reason, the output torque T2 actually outputted fluctuates as shown in FIG. 16B depending on combinations of a pinion gear and an output gear.

Figure 17B:
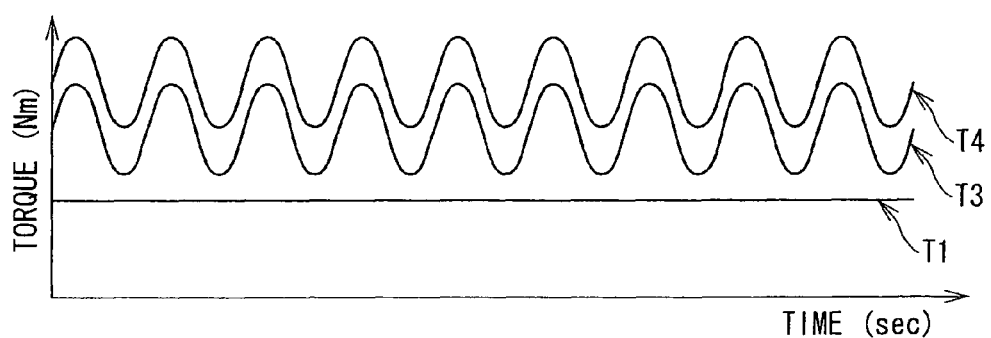

The teeth of the pinion gear 41 and the output gear 23 are spiral. The torque pulsation will be described with reference to FIG. 17, in which the teeth of the pinion gear 41 and the output gear 23 are assumed to be spiral teeth. If the output gear 23 and the pinion gear 41 have spiral teeth, force is generated in a thrust direction indicated by TH in FIG. 17A when rotated. This force in the thrust direction is reversed to be positive and negative depending on directions of rotation of the gears. As a result, if the gears have the spiral teeth and dimensional errors, the torque transfer efficiency η varies depending on combinations of meshed gears and directions of rotation. In case of spiral teeth gears, output torques T3 and T4 actually outputted include torque pulsations depending on combinations of meshed gears as shown in FIG. 17B. Since the force, which becomes positive and negative depending on the direction of rotation, is generated, torque pulsations differ depending on directions of rotation. In the example shown in FIG. 17, when the gear is rotated in the counter-clockwise direction, an output torque T3 is relatively reduced in comparison to a case, in which the teeth of gears are not spiral teeth. When the gear is rotated in the clockwise direction, an output torque T4 is increased relatively in comparison to a case, in which the teeth of gears are not spiral teeth. Such torque pulsation is also generated in case of the input gear 11 and the pinion gear 41.

As described above with reference to FIG. 16A, FIG. 16B, FIG. 17A and FIG. 17B, the output torque T2 fluctuates if the gears have dimensional error. It is assumed here that vibration torque is defined as a difference between a theoretical output torque Tt, which is outputted in case of ideal gears having no dimensional errors, and an output torque T2, which is actually outputted. The vibration torque is indicated as Tp, which is determined by subtracting the output torque T2 from the theoretical output torque Tt. The vibration torque Tp is determined in correspondence to combinations of meshed teeth. For this reason, the vibration torque Tp can be calculated based on the steering angle θh of the steering wheel 8 by measuring the vibration torque Tp under a condition that the gear mechanism 30 is assembled and driven.

The first embodiment is characterized in that the vibration torque Tp is pre-stored in correspondence to the steering angle θh in a memory or the like and the torque, which is required to be generated by the EPS motor 82, is corrected based on the vibration torque Tp. Since the teeth of the input gear 11, the output gear 23 and the pinion gear 41 are spiral teeth The vibration torque generated in the gear mechanism 30 when the steering wheel 8 is operated differ between steering the steering wheel 8 in the clockwise direction and the counter-clockwise direction. It is assumed that a clockwise steering vibration torque data map and a counter-clockwise steering vibration torque data map are pre-stored in the memory. The clockwise steering vibration torque data map defines a relation between the steering angle θh and the vibration torque Tp in case of operating the steering wheel 8 in the clockwise direction. The counter-clockwise steering vibration torque data map defines a relation between the steering angle θh and the vibration torque Tp in case of operating the steering wheel 8 in the counter-clockwise direction. It is further assumed that either one of the number of teeth of the input gear 11 and the output gear 23 and the number of teeth of the pinion gear 41 is odd and the other is even. As a result, different teeth mesh in the first rotation and the second rotation of the steering wheel 8, and hence the vibration torque differs correspondingly. Therefore, the angular range of the steering wheel angle θh is set as 0°≦|θh|<720° and the relation between the steering wheel angle θh and the vibration torque Tp is pre-stored.

Figure 18:
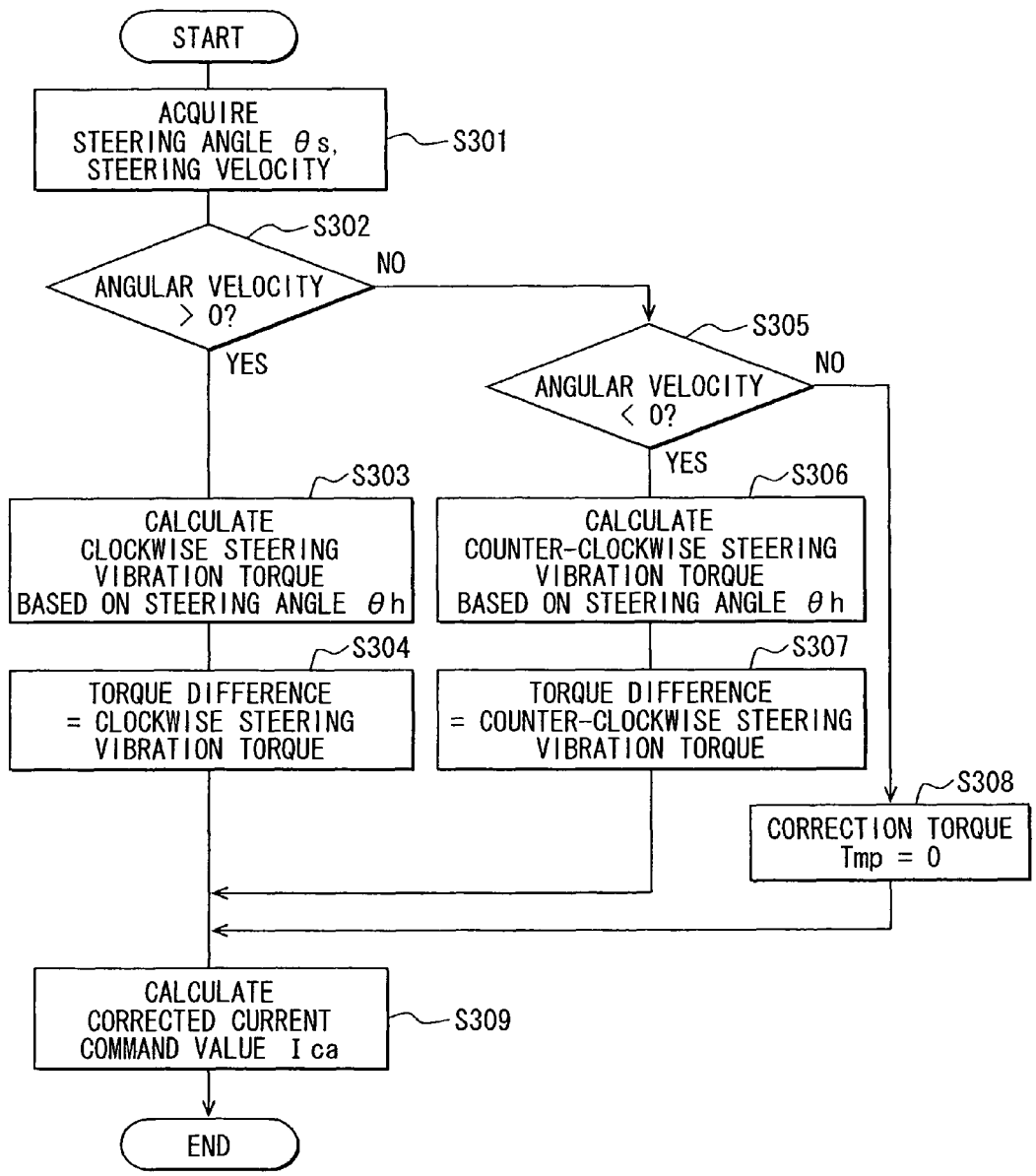
FIG. 18 is a flowchart showing assist torque correction processing in the first embodiment of the present invention.

Assist torque correction processing will be described next with reference to FIG. 18. The assist torque correction processing shown in FIG. 18 is performed by the EPS control part 86. At S302, first, the steering angle sensor value outputted by the steering sensor 92 is retrieved to acquire the steering wheel angle θh. In addition, a steering wheel angular velocity is acquired. The steering wheel angular velocity is calculated by differentiating the steering wheel angle θh. It is assumed that the steering wheel angular velocity is positive and negative when the steering wheel is operated in the clockwise direction and the counter-clockwise direction.

At S302, it is checked whether the steering wheel angular velocity is greater than 0. If the steering angular velocity is equal to or less than 0 (S302: NO), S305 is executed. If the steering angular velocity is greater than 0 (S302: YES), that is, if the steering angle 8 is operated in the clockwise direction, S303 is executed.

At S303, a clockwise steering vibration torque is acquired in correspondence to the steering wheel angular velocity θh by referring to the clockwise steering vibration torque data map. At S304, a torque difference tmp is calculated based on the clockwise steering vibration torque acquired at S303. The clockwise steering vibration torque acquired at S303 is set to be a torque difference tmp.

At S305, which is executed if the steering wheel angular velocity is equal to or less than 0 (S302: NO), it is checked whether the steering wheel angular velocity is less than 0. If the steering wheel angular velocity is not less than 0 (S305: NO), that is, steering wheel angular velocity is 0, S308 is executed. If the steering wheel angular velocity is less than 0 (S305: YES), that is, if the steering wheel 8 is operated in the counter-clockwise direction, S306 is executed.

At S306, a counter-clockwise steering vibration torque is acquired in correspondence to the steering wheel angular velocity θh by referring to the counter-clockwise steering vibration torque data map. At S307, a torque difference tmp calculated based on the counter-clockwise steering vibration torque acquired at S306. The counter-clockwise steering vibration torque acquired at S306 is set to be the torque difference tmp. At S308, which is executed when the steering wheel angular velocity is 0 (S305: NO), the torque difference tmp is set as tmp=0.

At S309, assist torque to be generated by the EPS motor 82 is corrected based on the torque difference tmp. Specifically, the EPS motor current command value Ic (FIG. 12) is corrected based on the torque difference tmp, that is, a corrected EPS motor current command value Ica is calculated, so that vibration torque arising from dimensional errors and the like of the gear mechanism 30 can be cancelled out. Assuming that a torque-current conversion coefficient is Ktm, the corrected EPS motor current command value Ica is calculated by the following equation (9).

$$Ica = Ic + tmp \times Ktm \qquad (9)$$

Figure 13:
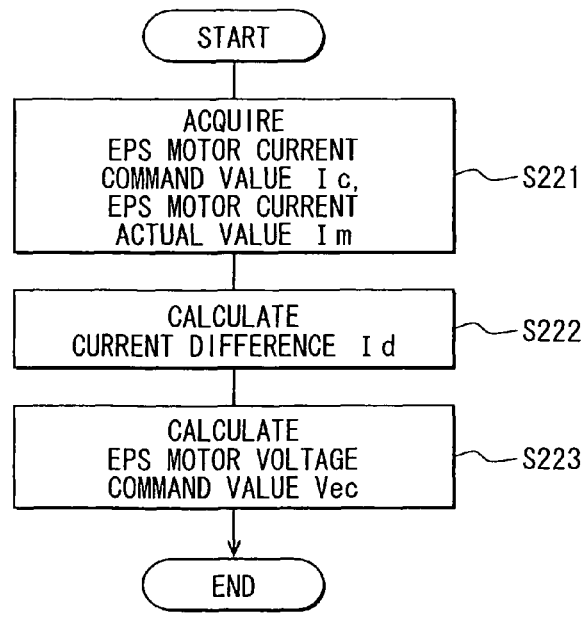
FIG. 13 is a flowchart showing EPS motor current control calculation processing in the first embodiment of the present invention.
Figure 14:
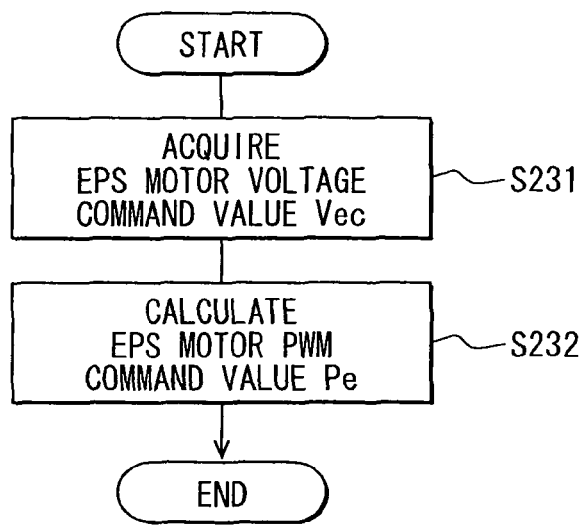
FIG. 14 is a flowchart showing PWM command value calculation processing performed by the EPS device in the first embodiment of the present invention.

In the processing in FIG. 13 and FIG. 14 related to control of the EPS device 5, each processing is executed by using the corrected EPS motor current command value Ica in place of the EPS motor current command value Ic. Thus, the EPS motor 82 generates corrected assist torque, which has been corrected to cancel the vibration torque generated by the gear mechanism.

The steering control apparatus 1 provides the following advantages.

(1) The input shaft 10 is coupled to the steering wheel operated by a driver. The output shaft 20 is provided rotatably relative to the input shaft 10 and provides a torque transfer path for transferring steering torque applied to the steering wheel 8 to the vehicle wheels 7. The VGRS device 3 includes a gear mechanism 30, which transfers rotation of the input shaft 10 to the output shaft 20, and the VGRS motor 52, which drives the gear mechanism 30, and varies the ratio of rotation angles of the input shaft 10 and the output shaft 20. The EPS device 5 includes the EPS motor 82 and assists steering operation of the steering wheel 8 by torque generated by driving the EPS motor 82.

The steering wheel angle θh is acquired (S301 in FIG. 8), and the vibration torque, which is generated by vibration of the gear mechanism 30 when the steering wheel 8 is operated at the acquired steering wheel angle θh, is acquired (S303, S306). The acquired vibration torque is set as the torque difference tmp (S304, S307), the EPS motor current command value Ic is corrected by the torque difference tmp, and the corrected EPS motor current command value ca is calculated (S309). The PWM command value is calculated (S220, S230 in FIG. 11) based on the corrected EPS motor current command value Ica calculated at S309, and the operation of the EPS motor 82 is controlled based on the calculated PWM command value;

In the gear mechanism 30, vibration is likely to occur due to, for example, dimensional errors and the like resulting from manufacturing tolerances. The assist torque, which is to be generated by the EPS device 5, is corrected based on the vibration torque caused by the vibration in the gear mechanism 30. The EPS motor 82 of the EPS device 5 is controlled to operate so that the EPS device 5 generates the assist torque, which is corrected to cancel the vibration torque generated in the gear mechanism 30. Thus, rattling and vibration generated by the gear mechanism 30 can be suppressed from being transferred to the steering wheel 8 through the input shaft 10 and a driver is released from uncomfortable feeling. Since rattling and vibration generated by the gear mechanism 30 are correctable by controlling the operation of the EPS motor 82, controlling precision in the manufacturing process can be eased. As a result, manufacturing cost can be reduced.

(2) The input gear 11, the output gear 23 and the pinion gear 41 are spiral gears. As a result, force is generated in the thrust direction due to dimensional errors and the like. This force in the thrust direction is reversed to be positive and negative in correspondence to the direction of rotation. The vibration torque generated by meshing of gears therefore differs depending on the direction of steering operation.

Therefore the following measure is taken. The steering wheel angular velocity is acquired (S301 in FIG. 18). When the steering wheel 8 is operated in the clockwise direction, the clockwise steering vibration torque is acquired (S303), which is generated by the vibration of the gear mechanism 30 in case of the clockwise operation of the steering wheel 8 at the steering angle θh. The torque difference tmp is calculated based on the acquired clockwise steering vibration torque (S304). When the steering wheel 8 is operated in the counter-clockwise direction, the counter-clockwise steering vibration torque is acquired (S306), which is generated by the vibration of the gear mechanism 30 in case of the counter-clockwise operation of the steering wheel 8 at the steering angle θh. The torque difference tmp is calculated based on the acquired counter-clockwise steering vibration torque (S307). The EPS motor current command value Ic is corrected based on the torque difference tmp thereby calculating the corrected EPS motor current command value Ica (S309). Thus, even in case that the vibration torque generated by the gear mechanism 30 differs depending on the direction of steering operation, the assist torque can be appropriately corrected in correspondence to the direction of steering operation and hence the uneasiness of the driver can be reduced.

(3) The torque transfer path is formed of the column shaft 2, which includes the input shaft 10 and the output shaft 20, and the rack-and-pinion mechanism 6 for translating the rotational motion of the column shaft 2 into the linear motion. The VGRS device 3 and the EPS device 5 are both provided in the column shaft 2. The VGRS device 3 and the EPS device 5 are integrated into a single module. Thus, the steering control apparatus 1 can be mounted even in a compact car, in which a VGRS device cannot be mounted because of limited mounting space.

The EPS control part 86 operates as vibration torque acquisition part, correction part, drive control part and steering direction acquisition part. S303 and S306 in FIG. 18 correspond to a function of the vibration torque acquisition part. S309 corresponds to a function of the correction part. S240 in FIG. 11 corresponds to a function of the drive control part. S301 in FIG. 18 corresponds to the steering direction acquisition part.

Second Embodiment

Figure 19:
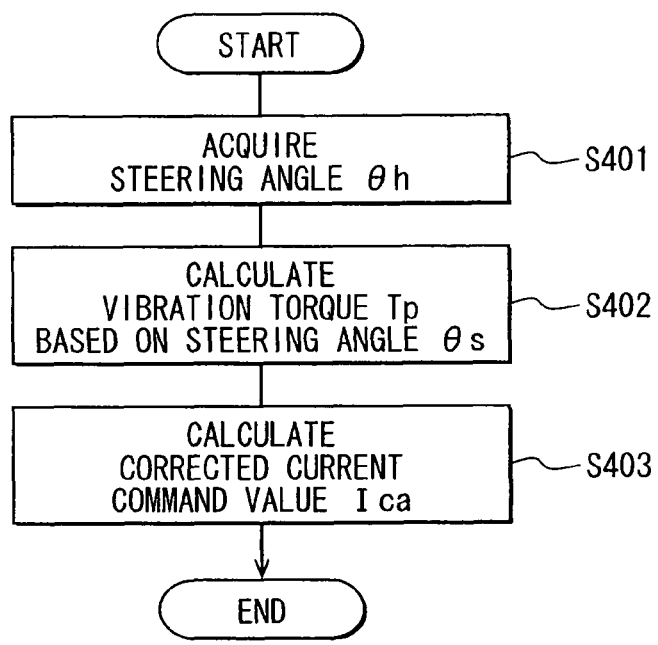
FIG. 19 is a flowchart showing assist torque correction processing in a second embodiment of the present invention.

Assist torque correction processing according to a second embodiment of the present invention will be described next with reference to FIG. 19. The steering control apparatus 1 according to the second embodiment is similar to the first embodiment in structure except that all of the input gear 11, the output gear 23 and the pinion gear 41, which form the gear mechanism 30, are not the spiral gears shown in FIG. 16A. The second embodiment is different from the first embodiment in respect of the assist torque correction processing executed by the EPS control part 86. For this reason, only the assist torque correction processing will be described next and the entire structure and control processing other than the assist torque correction processing will be omitted.

According to the second embodiment, since the gear mechanism 30 does not include spiral gears, the force in the thrust direction is not generated even if the gears have dimensional errors. As a result, the vibration torques, which will be generated when the steering wheel 8 is operated in the clockwise direction and the counter-clockwise direction, are the same. Accordingly, only one vibration torque data map, which defines a relation between a steering wheel angle θh and a vibration torque Tp, is pre-stored irrespective of direction of operation of the steering wheel 8.

At S401, the sensor value outputted by the steering wheel angle sensor 92 is retrieved to acquire the steering wheel angle θh. At S402, the vibration torque Tp corresponding to the steering wheel angle θh is acquired by referring to the vibration torque data map. The torque difference tmp is calculated based on the acquired vibration torque Tp. The acquired vibration torque Tp is set as the torque difference tmp.

At S403, the assist torque, which need be generated by the EPS motor 82, is corrected based on the torque difference tmp. Specifically, the EPS motor current command value Ic (see FIG. 12) is corrected based on the torque difference tmp, that is, the corrected EPS motor current command value Ica is calculated, so that vibration torque arising from dimensional errors and the like of the gear mechanism 30 can be cancelled out. Assuming that the torque-current conversion coefficient is Ktm, the corrected EPS motor current command value Ica is calculated by the foregoing equation (9).

According to the second embodiment, similarly to the first embodiment, each processing is executed by using the corrected EPS motor current command value Ica calculated at S403 in place of using the EPS motor current command value Ic. As a result, the corrected assist torque, which is corrected to cancel the vibration torque generated by the gear mechanism 30, is outputted.

The second embodiment provides the similar advantages as (1) and (2). Since the gear mechanism 30 is not the spiral gear mechanism, the assist torque to be generated by the EPS motor 82 is corrected by the vibration torque Tp corresponding to the steering wheel angle θh irrespective of the direction of operation of the steering wheel 8. The assist torque can thus be corrected readily. According the present embodiment, S402 corresponds to a function of the vibration torque acquisition part, and S403 corresponds to a function of the correction part.

Third Embodiment

Figure 20:
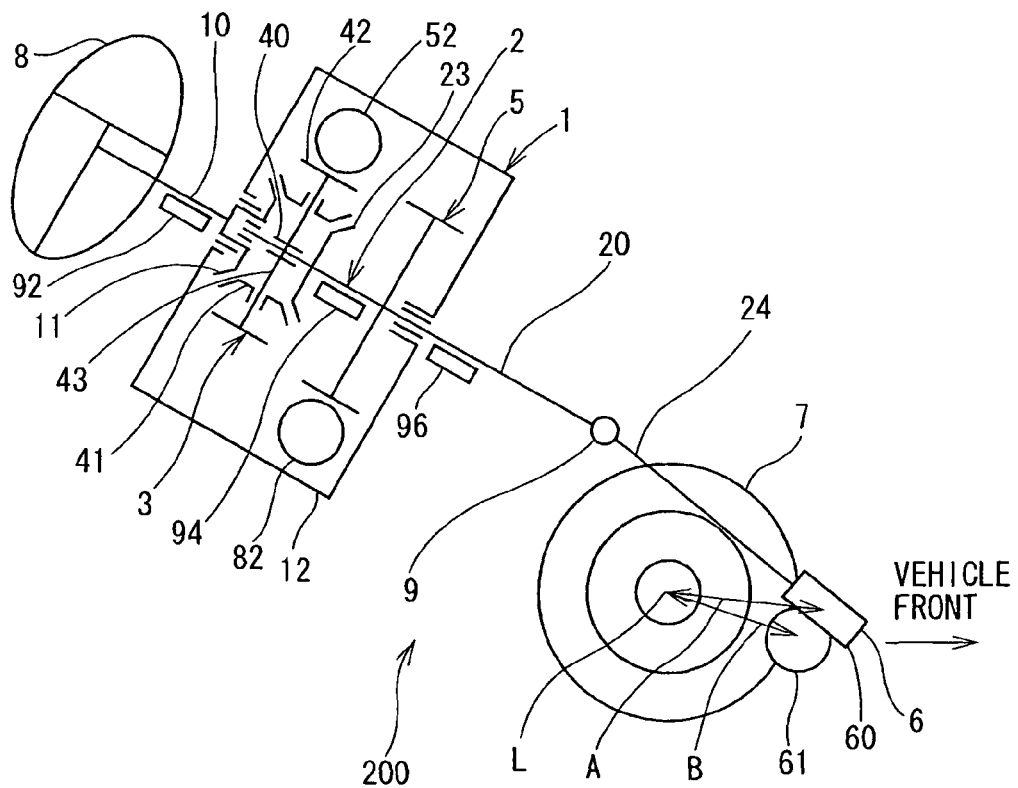
FIG. 20 is a schematic view showing a steering control apparatus according to the other embodiment of the present invention.

In the steering control apparatus 1 according to the foregoing embodiments, the rack-and-pinion mechanism 6 is provided at a more rear side of the vehicle relative to the straight line, which connects the rotation centers of the left and right vehicle wheels 7. This steering control apparatus 1 may be constructed as shown in FIG. 20 as a third embodiment. Substantially the same structure as in the foregoing embodiments is indicated by the same reference numerals and description is omitted. As shown by a steering system 200 shown in FIG. 20, the rack-and-pinion mechanism 6 may be provided at a more rear side of the vehicle relative to the straight line L connecting the centers of rotation of the left and right vehicle wheels 7. In the example shown in FIG. 20, the distance A between the steering pinion 60 and the straight line L connecting the centers of rotation of the left and right vehicle wheels 7 is shorter than the distance B between the steering rack bar 61 and the straight line L connecting the centers of rotation of the left and right vehicle wheels.

Also in the third embodiment shown in FIG. 20, the output shaft 20 rotates in the direction opposite to the direction of rotation of the input shaft 10 due to the differential gear provided between the input shaft 10 and the output shaft 20. When the steering wheel 8 is operated in the counter-clockwise direction, the steering pinion 60 rotates in the clockwise direction when viewed from the universal joint 9 and the steering rack bar 61 moves in the left direction. Thus, the steered angles of the vehicle wheels 7 are changed so that the vehicle is steered in the left direction. When the steering wheel 8 is operated in the clockwise direction, the steering pinion 60 rotates in the counter-clockwise direction when viewed from the universal joint 9 and the steering rack bar 61 moves in the right direction. Thus, the steered angles of the vehicle wheels 7 are changed so that the vehicle is steered in the right direction.

By thus setting the distance A between the steering pinion 60 and the straight line L connecting the centers of rotation of the left and right vehicle wheels 7 in the similar manner as the foregoing embodiments to be longer than the distance B between the steering rack bar 61 and the straight line L connecting the centers of rotation of the left and right vehicle wheels 7, that is, A>B, the vehicle wheels 7 are steered in the direction opposite to the direction of rotations of the output shaft 20, the shaft 24 and the steering pinion 60 so that the rotation direction of the steering wheel 8 and the steered direction of the vehicle wheels 7 are matched.

Other Embodiments

According to the foregoing embodiments, the vibration torque, which is generated by the gear mechanism 30 when the steering wheel 8 is operated, is pre-stored as the data map. The number of the teeth of the input gear 11 and the output gear 23 is one of odd and even, and the number of the teeth of the pinion gear 41 is the other of odd and even. Therefore, the vibration torque Tp is pre-stored in relation to the steering wheel angle θh over a range defined as $0° \leq θh < 720°$. As the other embodiment, in case that the meshed teeth do not change with rotation of the steering wheel 8, the vibration torque Tp may be pre-stored in relation to the steering wheel angle θh over a range defined as $0° \leq θh < 360°$. Further, in case that the vibration torque is possibly approximated to a function (for example, sine-wave function), which corresponds to the steering wheel angle, a function for calculating the vibration torque may be set and the vibration torque can be calculated by using such a function. Although the vibration torque generated by the gear mechanism 30 is pre-stored as the data map in the foregoing embodiments, the correction torque for correcting the EPS device may be pre-calculated as a function of the vibration torque and the correction torque may be pre-stored as the data map.

According to the foregoing embodiments, the VGRS device and the EPS device are integrated in a single module and provided in the column shaft. As the other embodiment, the VGRS device 3 and the EPS device 5 need not be integrated. The VGRS device 3 and the EPS device 5 may be provided at separate positions, for example, in the column shaft 2 and the rack shaft 61, respectively.

According to the foregoing embodiments, the VGRS-ECU 55 and the EPS-ECU 85 are provided separately. As the other embodiment, one ECU may be configured to control both the VGRS device 3 and the EPS device 5. According to the foregoing embodiments, the VGRS device 3 is controlled by calculating the VGRS motor voltage command value based on the rotation angle of the VGRS motor 52. However, the VGRS device 3 may be controlled based on the pinion angle detected by a pinion angle sensor in place of the rotation angle of the VGRS motor 52.

The present invention is not limited to the above-described embodiments but may be implemented in other different embodiments.

What is claimed is:

1. A steering control apparatus comprising:
   an input shaft coupled to a steering member operated by a driver;
   an output shaft provided rotatably relative to the input shaft and forming a torque transfer path for transferring steering torque applied to the steering member to vehicle wheels;
   a variable gear ratio device including a gear mechanism and a first motor and configured to variably control a ratio between a rotation angle of the input shaft and a rotation angle of the output shaft, the gear mechanism being configured to transfer rotation of the input shaft to the output shaft, and the first motor being configured to drive the gear mechanism;
   a power steering device including a second motor and configured to assist steering operation of the driver on the steering member by torque generated by driving the second motor;
   a vibration torque acquisition part configured to acquire vibration torque, which is generated by vibration of the gear mechanism when the steering member is operated;
   a correction part configured to correct assist torque provided to assist the steering operation of the driver on the steering member based on the vibration torque acquired by the vibration torque acquisition part; and
   an operation control part configured to control the second motor to output a corrected assist torque determined by the correction part.

2. The steering control apparatus according to claim 1, further comprising:
   a steering direction acquisition part configured to acquire a direction of steering operation of the steering member;
   when the direction of steering operation acquired by the steering direction acquisition part is a clockwise direction, the vibration torque acquisition part acquires a clockwise steering vibration torque, which is generated by vibration of the gear mechanism in case of a clockwise operation of the steering member, and the correction part corrects the assist torque based on the clockwise steering vibration torque; and
   when the direction of steering operation acquired by the steering direction acquisition part is a counter-clockwise direction, the vibration torque acquisition part acquires a counter-clockwise steering vibration torque, which is generated by vibration of the gear mechanism in case of a counter-clockwise operation of the steering member, and the correction part corrects the assist torque based on the counter-clockwise steering vibration torque.

3. The steering control apparatus according to claim 2, wherein:
   the gear mechanism includes at least one set of spiral gears.

4. The steering control apparatus according to claim 2, wherein:
   the torque transfer path includes a column shaft, which includes the input shaft and the output shaft, and a rack-and-pinion mechanism configured to change rotational motion of the column shaft into linear motion; and
   the variable gear ratio device and the power steering device are both provided in the column shaft.

5. The steering control apparatus according to claim 4, wherein:
   the variable gear ratio device and the power steering device are integrated into a single module.

6. The steering control apparatus according to claim 1, wherein:
   the gear mechanism includes at least one set of spiral gears.

7. The steering control apparatus according to claim 6, wherein:
   the torque transfer path includes a column shaft, which includes the input shaft and the output shaft, and a rack-and-pinion mechanism configured to change rotational motion of the column shaft into linear motion; and
   the variable gear ratio device and the power steering device are both provided in the column shaft.

8. The steering control apparatus according to claim 7, wherein:

the variable gear ratio device and the power steering device are integrated into a single module.

9. The steering control apparatus according to claim 1, wherein:

the torque transfer path includes a column shaft, which includes the input shaft and the output shaft, and a rack-and-pinion mechanism configured to change rotational motion of the column shaft into linear motion; and the variable gear ratio device and the power steering device are both provided in the column shaft.

10. The steering control apparatus according to claim 9, wherein:

the variable gear ratio device and the power steering device are integrated into a single module.

11. The steering control apparatus according to claim 1, wherein:

the vibration torque acquisition part is configured to determine the vibration torque based on a rotation angle of the steering member.

\* \* \* \* \*